United States Patent [19]

Schwan

[11] 3,917,595

[45] Nov. 4, 1975

[54] 4-METHYL-α,2-DIPHENYL-5-PYRIMIDINEMETHANOL

[75] Inventor: Thomas J. Schwan, Norwich, N.Y.

[73] Assignee: Morton-Norwich Products, Inc., Norwich, N.Y.

[22] Filed: Nov. 1, 1974

[21] Appl. No.: 520,011

[52] U.S. Cl. .............................. 260/251 R; 260/592
[51] Int. Cl.² .................................. C07D 239/00
[58] Field of Search ............................... 260/251 R

[56] References Cited
OTHER PUBLICATIONS

J. Amer. Chem. Soc. 16 pp. 2156–2162 (1971).

*Primary Examiner*—Lewis Gotts
*Assistant Examiner*—D. R. Phillips
*Attorney, Agent, or Firm*—Anthony J. Franze

[57] ABSTRACT

The compound 4-methyl-α,2-diphenyl-5-pyrimidinemethanol possesses pharmacological activity as an anticonvulsant agent.

1 Claim, No Drawings

4-METHYL-<,2-DIPHENYL-5-PYRIMIDINEMETHANOL

This invention relates to a chemical compound. In particular it is concerned with the compound of the formula:

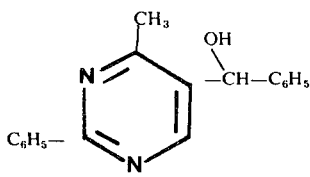

This compound possesses pharmacological activity affecting the central nervous system. When administered perorally to mice it exhibits anticonvulsant action. This anticonvulsant property is evidenced in the control of pentylenetetrazol induced convulsions. When administered orally in doses ranging from 50–200 mg/kg in 0.5 percent aqueous methyl cellulose to mice intravenously receiving 45 mg/kg of pentylenetetrazol, this compound counteracted the convulsive property of pentylenetetrazol.

In order that this invention may be readily available to and understood by those skilled in the art the following example is appended:

EXAMPLE I

A. 2-Ethoxymethylene-1-phenyl-,1,3-butanedione

To 200 g (1.23 moles) of benzoylacetone was added 320 g (2.16 moles) of ethyl orthoformate followed by 360 g (3.52 mole) acetic anhydride. The mixture was stirred and refluxed for 3.0 hours and the pot temperature dropped from 120° to 100° during the reflux period. The reflux condenser was removed and the volatile products were distilled at pot temperature up to 140°. The remaining acetic anhydride and ethyl orthoformate were removed on a rotary evaporator at 100°. The residue crystallized at room temperature and was recrystallized from toluene to give in two crops 206 g (77%) of the product, m.p. 68°–71°.

The analytical sample, m.p. 68°–71°, was obtained by recrystallization from toluene.

Anal. Calcd. for $C_{13}H_{14}O_3$: C, 71.54; H, 6.47. Found: C, 71.65; H, 6.47.

B. 2,4-Diphenyl-5-pyrimidyl Methyl Ketone and 2-Phenyl-4-methyl-5-pyrimidyl Phenyl Ketone To 1500 ml of methanol stirred at room temperature was added quickly 108 g (2.0 moles) of sodium methoxide. The solution was allowed to stand at ambient temperature for 90 minutes then cooled to 15° while 348 g (2.0 moles) of benzamidine hydrochloride monohydrate was added quickly with vigorous stirring. While the mixture was initially cooled and stirred at 0°, a solution of 436 g (2.0 moles) of A in 800 ml methanol was added over 30 minutes. The mixture was stirred at ambient temperatures for 18 hours, then stirred and refluxed for an additional 4 hours before methanol (2200 ml) was distilled off at atmospheric pressure. Chloroform (1000 ml) and water (500 ml) were added to the residue and the mixture was stirred at ambient temperature for 20 minutes.

The organic layer was separated and the aqueous layer was extracted with two 150 ml portions of chloroform. The combined organic extracts were washed with 500 ml water, dried (MgSO$_4$), and concentrated to dryness in vacuo to give 562 g of an oily residue which crystallized at room temperature.

The residue was dissolved in 1600 ml boiling absolute ethanol and the solution was stored at ambient temperatures 30 minutes. The mixture was allowed to stand at ambient temperature for 15 hours, and then filtered. The crystalline product was washed with 250 ml absolute ethanol, and air dried to give 254 g (46%) of 2,4-diphenyl-5-pyrimidyl methyl ketone m.p. 100°–108°.

An analytical sample of 2,4-diphenyl-5-pyrimidyl methyl ketone m.p. 107°–110°, was obtained by recrystallization from ethanol.

Anal. Calcd. for $C_{18}H_{14}N_2O$: C, 78.81; H, 5.14; N, 10.21. Found: C, 78.46; H, 5.11; N, 10.15.

The filtrate and washings from the isolation of the product were concentrated to 1600 ml, allowed to cool to room temperature, and seeded. The mixture was allowed to stand at ambient temperature for 24 hours and filtered. An additional 6.3 g of 2,4-diphenyl-5-pyrimidyl methyl ketone was obtained.

The filtrate was concentrated to 500 ml in a stainless steel beaker. Solution was cooled to room temperature. The mixture was stored at room temperature for 72 hours. The solid was filtered, washed with three 100 ml portions of absolute ethanol, and air dried to give 212 g of solid product.

Recrystallization of the product from 500 ml absolute ethanol gave 157 g (29%) of 2-phenyl-4-methyl-5-pyrimidyl phenyl ketone, m.p. 56°–68°.

An analytical sample of 2-phenyl-4-methyl-5-pyrimidyl phenyl ketone, m.p. 68°–72°, was obtained by recrystallization from absolute ethanol.

Anal. Calcd. for $C_{18}H_{14}N_2O$: C, 78.81; H, 5.14; N, 10.21. Found: C, 78.64; H, 5.18; N, 10.29.

4-Methyl-α,2-diphenyl-5-pyrimidinemethanol

To a mixture of 41.1 g (0.15 mole) of 2-phenyl-4-methyl-5-pyrimidyl phenyl ketone (Example I-B) in 300 ml methanol stirred at 15°–20° was added over 20 min 11.4 g (0.30 mole) of sodium borohydride. The solution was stirred at ambient temperatures for 60 hours. The solvents were removed in vacuo and the residue was partitioned between 500 ml CHCl$_3$ and 300 ml water. The aqueous layer was extracted with two 100 ml portions of CHCl$_3$ and the combined CHCl$_3$ extracts were washed with 150 ml water, dried (MgSO$_4$), and concentrated to dryness in vacuo.

Crystallization from 150 ml toluene gave, in three crops, 32.10 g of the crude product. Further crystallization from 120 ml toluene gave 17.4 g (42%) of the product, m.p. 130°–136°.

Recrystallization from toluene gave an analytical sample, m.p. 135°–137°.

Anal. Calcd. for $C_{18}H_{16}N_2O$: C, 78.23; H, 5.84; N, 10.14. Found: C, 78.22; H, 5.79; N, 10.15.

What is claimed is:

1. 4-methyl-α, 2-diphenyl-5-pyrimidinemethanol.

* * * * *